(12) United States Patent
LeBeau (10) Patent No.: US 9,991,924 B2
(45) Date of Patent: Jun. 5, 2018

(54) CASE DESIGN FOR A PERSONAL ELECTRONICS DEVICE WITH A PLUG-IN ACCESSORY

(71) Applicant: Seek Thermal, Inc., Santa Barbara, CA (US)

(72) Inventor: Tim LeBeau, Santa Barbara, CA (US)

(73) Assignee: Seek Thermal, Inc., Santa Barbara, CA (US)

( * ) Notice: Subject to any disclaimer, the term of this patent is extended or adjusted under 35 U.S.C. 154(b) by 0 days. days.

(21) Appl. No.: 15/076,670

(22) Filed: Mar. 22, 2016

(65) Prior Publication Data
US 2016/0294429 A1 Oct. 6, 2016

Related U.S. Application Data

(60) Provisional application No. 62/142,646, filed on Apr. 3, 2015.

(51) Int. Cl.
| | |
|---|---|
| *H04B 1/38* | (2015.01) |
| *H04B 1/3888* | (2015.01) |
| *H04M 1/02* | (2006.01) |
| *H04M 1/725* | (2006.01) |
| *H04W 4/00* | (2018.01) |
| *H04M 1/18* | (2006.01) |
| *A45C 11/00* | (2006.01) |

(52) U.S. Cl.
CPC ........ *H04B 1/3888* (2013.01); *H04M 1/0254* (2013.01); *H04M 1/185* (2013.01); *H04M 1/72527* (2013.01); *H04W 4/008* (2013.01); *A45C 2011/002* (2013.01); *H04M 1/0264* (2013.01)

(58) Field of Classification Search
CPC ............ A45C 2011/002; H04B 1/3888; H04B 1/3883; H04M 1/026; H04M 1/0264; H04M 1/0252
USPC ....................................... 455/575.8
See application file for complete search history.

(56) References Cited

U.S. PATENT DOCUMENTS 8,467,183 B2 *   6/2013   Probst ................... G06F 1/1616
                                                              345/168
9,294,596 B2 *   3/2016   Kim ..................... H04M 1/0266
(Continued)

OTHER PUBLICATIONS

FLIR ONE First Generation for iPhone 5/5s. http://www.flir.com/flirone/content/?id=69323.

*Primary Examiner* — Duc M Nguyen
(74) *Attorney, Agent, or Firm* — Knobbe Martens Olson & Bear LLP (57) ABSTRACT

A protective case design for a personal electronics device (PED) and an optional plug-in accessory, wherein the accessory mounts to the PED by plugging in to a PED interface connector, including at least one first case section covering a portion of the PED not holding the connector, and two interchangeable mating case sections covering the remaining portion of the PED including the connector portion. One of the interchangeable case sections covers the PED in operation without the accessory installed, and the other interchangeable section is configured to protect the accessory and complete the case protection while maintaining operable accessory-to-PED-connector electrical and mechanical connection when the case sections including the accessory are mated together. The accessory may be a thermal imaging camera.

20 Claims, 9 Drawing Sheets

(56) References Cited

U.S. PATENT DOCUMENTS

| | | | |
|---|---|---|---|
| 9,531,422 B2* | 12/2016 | Jang | H04B 1/3888 |
| 9,735,825 B2* | 8/2017 | Lee | G06F 3/14 |
| 2002/0013161 A1* | 1/2002 | Schaeffer | H04M 1/0262 |
| | | | 455/557 |
| 2004/0097256 A1* | 5/2004 | Kujawski | H04M 1/72527 |
| | | | 455/550.1 |
| 2005/0247787 A1* | 11/2005 | Von Mueller | G06K 7/084 |
| | | | 235/449 |
| 2007/0203963 A1* | 8/2007 | Chen | G06F 1/1616 |
| | | | 708/100 |
| 2010/0048268 A1* | 2/2010 | O'Neill | H04B 1/3888 |
| | | | 455/575.8 |
| 2011/0049005 A1* | 3/2011 | Wilson | A45C 11/00 |
| | | | 206/701 |
| 2011/0259664 A1* | 10/2011 | Freeman | A45C 11/00 |
| | | | 181/202 |
| 2012/0106078 A1* | 5/2012 | Probst | G06F 1/1616 |
| | | | 361/679.56 |
| 2012/0303520 A1* | 11/2012 | Huang | H01M 10/46 |
| | | | 705/39 |
| 2012/0320501 A1* | 12/2012 | Ackloo | G06F 1/1628 |
| | | | 361/679.01 |
| 2013/0149964 A1* | 6/2013 | Kreiner | H04M 1/72575 |
| | | | 455/41.2 |
| 2014/0099526 A1* | 4/2014 | Powell | H01M 2/1066 |
| | | | 429/100 |
| 2015/0011258 A1* | 1/2015 | Rang | H04M 1/0256 |
| | | | 455/556.1 |
| 2015/0136621 A1* | 5/2015 | Lebauer | B65D 81/02 |
| | | | 206/216 |
| 2015/0155903 A1* | 6/2015 | Jang | H04B 1/3888 |
| | | | 455/575.8 |
| 2015/0311940 A1* | 10/2015 | Lee | H04B 1/3888 |
| | | | 455/575.8 |

* cited by examiner

CASE DESIGN FOR A PERSONAL ELECTRONICS DEVICE WITH A PLUG-IN ACCESSORY

CROSS-REFERENCE TO RELATED APPLICATIONS

This application claims the benefit of priority to U.S. Prov. Pat. App'n No. 62/142,646, entitled "A Case Design for a Personal Electronics Device with a Plug-in Accessory," filed Apr. 3, 2015, the entire contents of which is incorporated herein by reference for all purposes.

BACKGROUND

Field

The specification relates to a protective case design for a personal electronics device (PED), and in particular to a case design that includes a first configuration configured to protect the PED in standalone operation, and a second configuration configured to protect both the PED and a plug-in accessory when the accessory is coupled to the PED.

Description of Related Art

A variety of plug-in accessories for PEDs are increasingly available. Some accessories, such as thermal cameras or thermal sensors that mount to a PED interface connector, such as a lightning or micro-USB connector common to smartphones, may be desirable for use outdoors or in other such challenging and rugged environments. To make PEDs more resistant to damage in challenging and rugged environments, or for everyday use, a user may elect to attach a protective case to the PED.

SUMMARY

Embodiments described herein have innovative aspects, no single one of which is indispensable or solely responsible for their desirable attributes. Without limiting the scope of the disclosure and/or claims, some of the advantageous features will now be summarized.

In some embodiments, a protective case may be provided for protecting a PED in a first configuration and for protecting the PED and a plug-in accessory coupled thereto in a second configuration. In the first configuration, the case can cover a substantial portion of the PED to reduce potential damage to the PED. In the second configuration, the case can cover the substantial portion of the PED as well as a substantial portion of the plug-in accessory. In some embodiments, the accessory may be a thermal imaging camera or sensor that couples to a PED through a connector, such as lightning or micro USB connectors. As used herein, the terms camera and sensor interchangeably represent at least an imaging plug-in accessory, such as a thermal imaging plug-in accessory for a PED.

In a first aspect, a protective case design for a personal electronics device (PED) and an optional plug-in accessory is provided, wherein the accessory may couple to the PED through complementary connectors (e.g., male and female lightning connectors, male and female micro-USB connectors, etc.). The protective case includes at least one first case section covering a first portion of the PED not holding the connector, and at least two interchangeable second case sections, each of the two interchangeable second case sections configured to mate with or attach to the first case section. In use, one of the interchangeable case sections can be configured to be part of a protective enclosure around a periphery of the PED in operation without the accessory installed. In use, the other interchangeable section, referred to as an accessory mating section, may be configured to protect both the plug-in accessory and the PED to form a protective enclosure around a periphery of the combination of the PED and the plug-in accessory in operation. In this configuration, the plug-in accessory can maintain operable electrical and mechanical connections with an accessory-to-PED connector when the first and second case sections are mated together.

In some embodiments of the first aspect, the case may be a ruggedized design.

In some embodiments of the first aspect, the accessory mating section may include a removable lens cap for the camera. In further embodiments, the accessory mating section may include a tether for the lens cap. In further embodiments, the accessory mating section may include a stowing point for the lens cap when the lens cap is removed.

In some embodiments, the first case section may be a slide-on sleeve covering a part of the non-connector portion of the PED, with suitable access to controls and connection points. The interchangeable second case section for operation without the plug-in accessory, referred to herein as the non-camera case section, may be a slide-on sleeve that mates with the first case section, covering the remainder of the PED with suitable access to controls and connection points. The interchangeable second case section for operation with the plug-in accessory (e.g., a thermal camera), referred to herein as the accessory mating section, includes a protective accessory portion and a slide-on sleeve that mates with the first case section. When combined, the first case section and the accessory mating section are configured to mate the accessory connector to the PED connector when the accessory mating section is slid on to the PED to mate with the first case section. In some embodiments, the accessory mating section may be a snap-together enclosure for a camera or other plug-in accessory.

In some embodiments of the first aspect, the interchangeable accessory mating section may include thermal venting. In some embodiments of the first aspect, the interchangeable accessory mating section may include a sound resonator and sound pathway for compatibility with PED speakers located within the protective area of the accessory mating section.

In some embodiments, the accessory is configured to couple to the PED through a connector, including lightning connectors, micro-USB connectors, and/or 35 mm ports. In some embodiments, the accessory is configured to communicably couple to the PED through a network interface, including Wi-Fi and Bluetooth interfaces.

In a second aspect, a protective case is provided for a personal electronics device (PED) configured for use with or without an accessory, wherein the accessory mounts to the PED by plugging in to a PED interface connector. The case includes a first case section comprising a mechanical case coupling and a unitary body configured to substantially cover a periphery of a PED to provide protection to the PED. The case includes a PED case section comprising an attachment feature that is configured to mate to the mechanical case coupling feature of the first case section. The case includes an accessory case section comprising an accessory enclosure and an attachment feature that is configured to mate to the mechanical case coupling feature of the first case section, the accessory enclosure configured to receive an accessory. The PED case section and the accessory case section are configured to be interchangeably coupled to the first case section to form a protective enclosure. In a first configuration, the PED case section is mechanically coupled to the first case section to form a protective enclosure for a PED; and, in a second configuration, the accessory case section is mechanically coupled to the first case section to form a protective enclosure for a PED and an accessory coupled to the PED.

In some embodiments of the second aspect, the first case section is configured to cover corners of a PED. In some embodiments of the second aspect, the first case section is configured to cover all four corners of a PED and to provide access to the PED interface connector.

In a third aspect, a protective case is provided for a personal electronics device (PED) configured for use with or without an accessory, wherein the accessory mounts to the PED by plugging in to a PED interface connector. The case includes a first case section comprising a mechanical case coupling and a unitary body configured to substantially cover a periphery of a PED to provide protection to the PED. The case includes a removable case section configured to be seated in the mechanical case coupling to provide a smooth exterior surface of the protective case. The case includes an accessory case section comprising an accessory enclosure and an attachment feature that is configured to mate to the mechanical case coupling feature of the first case section when the removable case section is removed to expose the mechanical case coupling feature, the accessory enclosure configured to receive an accessory. In a PED configuration, the removable case section is mechanically coupled to the first case section; and, in an accessory configuration, the removable case section is removed from the first case section and the accessory case section is mechanically coupled to the first case section to form a protective enclosure for a PED and an accessory coupled to the PED.

In some embodiments of the third aspect, the accessory case section forms an opening for a lens of an imaging system positioned in the accessory enclosure. In a further embodiment, the accessory case section includes a removable lens cap to selectively cover the opening.

In a fourth aspect, a kit is provided that is configured to provide a protective case for a personal electronics device (PED) configured for use with or without an accessory, wherein the accessory mounts to the PED by plugging in to a PED interface connector. The kit comprising includes a first case section comprising a mechanical case coupling and a unitary body configured to substantially cover a periphery of a PED to provide protection to the PED. The kit includes a PED case section comprising an attachment feature that is configured to mate to the mechanical case coupling feature of the first case section. The kit includes an accessory case section comprising an accessory enclosure and an attachment feature that is configured to mate to the mechanical case coupling feature of the first case section. The PED case section and the accessory case section are configured to be interchangeably coupled to the first case section to form a protective enclosure. In a first configuration, the PED case section is mechanically coupled to the first case section to form a protective enclosure for a PED; and, in a second configuration, the accessory case section is mechanically coupled to the first case section to form a protective enclosure for a PED and an accessory coupled to the PED.

In some embodiments of the fourth aspect, the accessory case section forms an opening for a lens of an imaging system positioned in the accessory enclosure.

In some embodiments of the first, second, third, and/or fourth aspects, the accessory may be one of a thermal imaging camera or thermal imaging sensor.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

FIG. 5 illustrates an assembled protective case configuration for the PED operating without the accessory plugged in.

FIG. 6 illustrates a disassembled protective case configuration for the PED operating without the accessory plugged in.

FIG. 7 illustrates an assembled protective case configuration for the PED operating with the accessory plugged in.

FIG. 8 illustrates a disassembled protective case configuration for the PED operating without the accessory plugged in.

FIG. 9 illustrates another view of the disassembled protective case configuration for the PED operating without the accessory plugged in.

DETAILED DESCRIPTION

Generally described, aspects of the present disclosure relate to protective cases for personal electronic devices. The disclosed protective cases are formed from a combination of case sections. The case sections include a first case section that is configured to substantially cover a periphery and/or backside of the personal electronics device and a second case section that can be a PED case section or an accessory case section. The PED case section and the accessory case sections are interchangeable in the sense that both couple to the first case section to provide a protective enclosure for the PED. The PED case section is configured to couple to the first case section to form a complete protective case for the PED when the accessory is not coupled to the PED. The accessory case section is configured to provide a protective enclosure for an accessory and to couple to the first case section to form a complete protective case for the PED and the accessory when the accessory is coupled to the PED. Advantageously, this can allow the protective case to be used when the PED is not coupled to the accessory and to be used when the PED is coupled to the accessory without sacrificing the benefits of the use of a protective case. Similarly, the disclosed protective cases make it relatively quick and easy to switch protective case configurations to alternate between using the PED with and without the accessory.

Although examples and implementations described herein focus, for the purpose of illustration, on implementations where the accessory is an infrared camera, the cases disclosed herein can be implemented for use with many different types of accessories that are designed to be coupled to or mounted to a PED while in use. Various aspects of the disclosure will now be described with regard to certain examples and embodiments, which are intended to illustrate but not limit the disclosure.

Some embodiments described herein may provide for a protective case for both a PED and a plug-in accessory for a PED, when the accessory is plugged in and operating.

Some embodiments described herein may provide for two case configurations that provide convenient and effective protection for the PED both when the accessory is plugged in and when the PED is used without the accessory and for convenient and quick interchange between the two modes of operation.

Some embodiments described herein may provide for a rugged case design that makes use of the accessory outdoors and/or in severe environments more practical. In particular, if the accessory is a plug-in thermal imaging sensor, outdoor protected use for both the camera and PED may be provided.

Some embodiments described herein may provide for viewing of images on a PED that is covered by the protective case while coupled to a personal thermal imaging camera or sensor.

Plug-in accessories for PEDs such as smartphones, tablets, and the like are becoming increasingly common. PEDs often have at least one interface connector that both has power connections and data transfer connections, allowing a device plugged into the connector to share power and engage in high-speed data communication with the PED. Alternatively some PEDs also allow data communication across wireless networks such as Wi-Fi, Bluetooth and others. For instance, PEDs such as smartphones and tablets typically use lightning and micro-USB connectors as the main charging and data connections. Both of these connectors are designed to provide a snug mechanical connection as well as electrical connections, allowing for plug-in accessories to mount to the connector and to be held securely enough for normal use. Additionally, some PEDs have a 35-mm port suitable for plug-in accessories. Other connectors may be used as well. The connector may be used as a mechanical mount for a plug-in accessory and data may be either transmitted through the connector or through a wireless interface depending on the PED and accessory design. It would be advantageous, then, to provide a protective case that is configured to protect the PED and the accessory both when the accessory is mounted to the PED and when it is not. Further, it would be advantageous to provide a protective case that does not require removing the entire protective case to switch between using the PED with and without the accessory. Further, for some applications, it would be advantageous to provide a protective case that mechanically supports the accessory when mounted to the PED.

Accordingly, disclosed herein are protective cases for a PED wherein the protective cases include interchangeable sections that can be easily swapped depending on the desired use of the PED (e.g., with or without the accessory being mounted to the PED). These protective cases can be provided in a kit comprising at least three components: a first case section configured to substantially surround a periphery of a PED, a PED case section configured to mechanically attach to the first case section suitable for use when an accessory is not mounted to the PED, and an accessory case section configured to mechanically attach to the first case section to complete the protective case for the PED as well as to provide a housing for an accessory, allowing the accessory to couple to the PED.

Figure 1A:
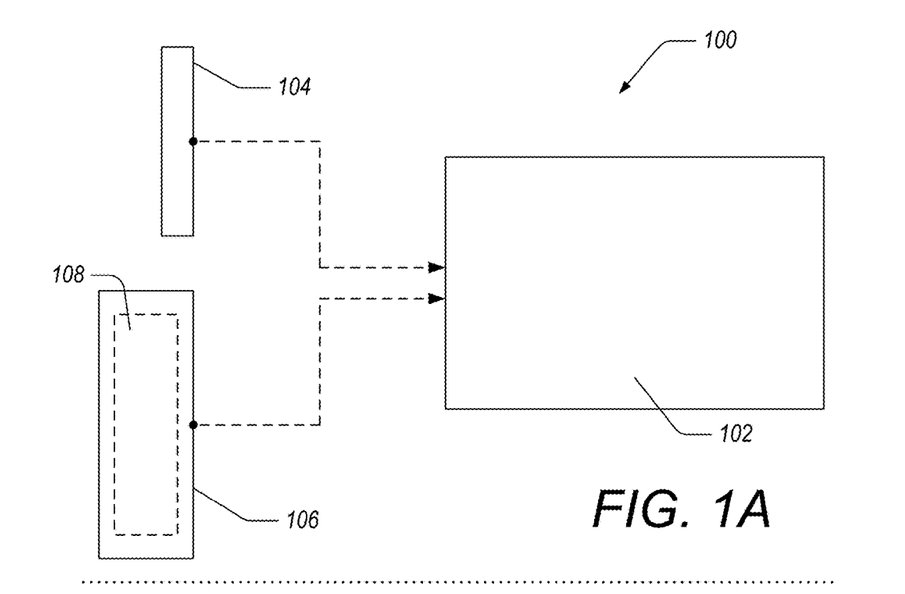
FIGS. 1A-1C illustrate a block diagram of an example protective case, wherein the protective case includes interchangeable case portions.
Figure 1B:
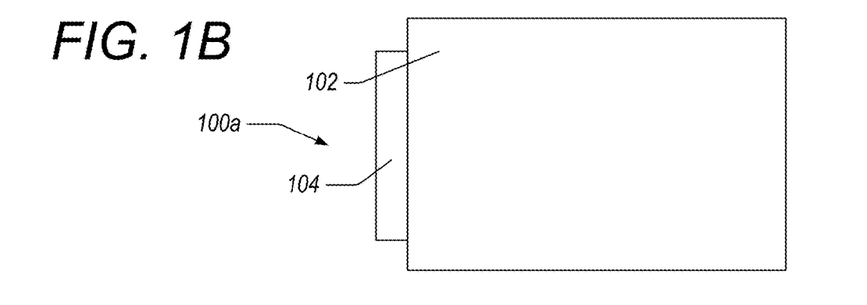
Figure 1C:
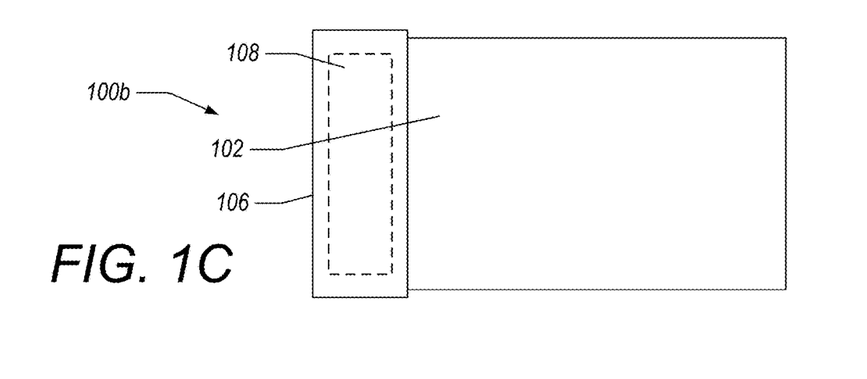

FIGS. 1A-1C illustrate a block diagram of an example protective case 100, wherein the protective case 100 includes interchangeable case portions 102, 104, 106. FIG. 1A illustrates the protective case 100 wherein the protective case includes a first case section 102 that is configured to mechanically couple to a PED case section 104 and to an accessory case section 106. The accessory case section 106 includes an accessory enclosure 108 that is configured to receive an accessory to provide a protective enclosure for the accessory.

FIG. 1B illustrates a first configuration of the protective case 100a wherein the first case section 102 is mechanically coupled to the PED case section 104. In the first configuration, the protective case 100a is configured to provide protection for a periphery of a PED housed within the protective case 100a. Furthermore, the protective case 100a can be configured to provide access to connectors, buttons, interface features, cameras, sensors, and the like on a PED when the PED is housed within the protective case 100a. In some embodiments, the connectors of the PED are exposed when housed within the protective case 100a allowing access to them. In some embodiments, the PED case section 104 is configured to mechanically couple to the first case section 102 in a way that does not significantly increase coverage of the PED by the protective case 100a. In such embodiments, the PED case section 104 can serve to provide a targeted shape or contour of an exterior surface of the protective case 100a. In some embodiments, the PED case section 104 can serve to expose a connection point for the accessory case section 106 when the PED case section 104 is removed.

FIG. 1C illustrates a second configuration of the protective case 100b wherein the first case section 102 is mechanically coupled to the accessory case section 106 with the accessory enclosure 108. In the second configuration, the protective case 100b provides protection for the PED and the accessory when the accessory is mounted to the PED.

In some embodiments, the accessory case section 106 includes mechanical connection features configured to mate with complementary features on the first case section 102. The PED case section 104 can include identical or similar mechanical connection features to the accessory case section 106, making the accessory case section 106 and the PED case section 104 interchangeable. In some embodiments, the majority of the PED case section 104 comprises these mechanical connection features so that, when coupled to the first case section, the PED case section does not significantly increase the size and/or coverage of the protective case 100a.

As described herein, a protective enclosure can include an enclosure that provides mechanical protection to the PED and/or accessory. This is not intended to imply complete coverage of the PED and/or accessory. The protective cases disclosed herein can allow large portions of the PED to be uncovered by the case while still providing desirable or adequate protection. For example, a protective case can cover corners of the PED and/or accessory while leaving portions of the sides and/or back of the PED and/or accessory uncovered. Similarly, a protective case can cover a periphery of the PED, extending partially around to a front face of the PED, to provide protection to the front face of the PED (e.g., screen).

Figure 2A:
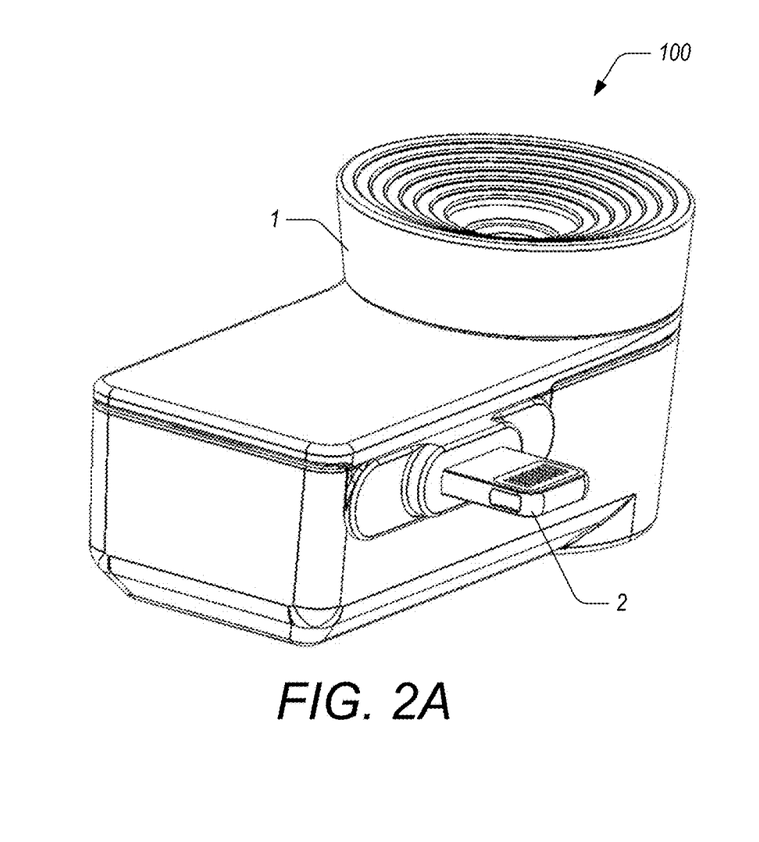
FIGS. 2A and 2B illustrate a thermal imaging camera interfaced to an interface connector of a Personal Electronics Device (PED).
Figure 2B:
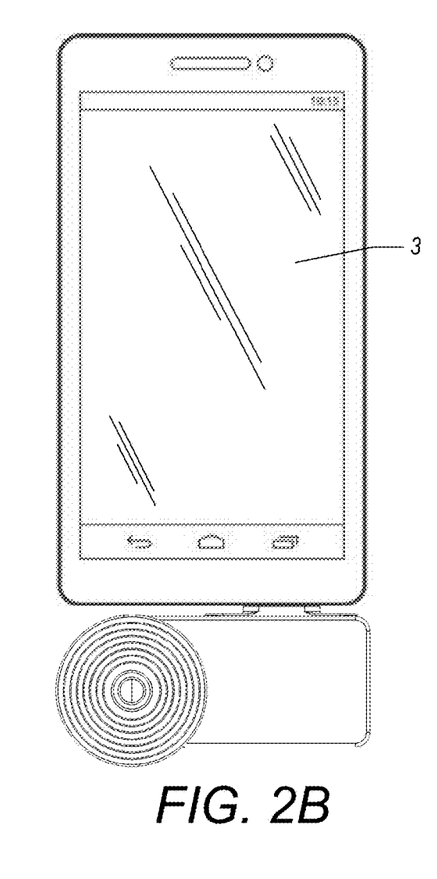

A variety of plug-in devices exist. One such plug-in accessory is a thermal camera, or sensor, 1 shown in FIG. 2A. Sensor/camera 1 has a connector 2 compatible with a PED connector, shown illustratively in FIG. 2A as a male lightning connector which can plug into the female lightning receptacle, such as on Apple products. Connector 2 could also be a micro-USB connector compatible with, for example, Android devices or other suitable connectors. As shown in FIG. 2B, camera 1 is plugged into PED 3. The camera may optionally receive power across the connector, or have its own power supply, and the data transfer rates of connection protocols such as the Apple and Android protocols, as well as wireless data connections, support data transfer rates adequate for transferring image data at many frames per second, thus allowing the PED to control the camera from its user interface, acquire image data, and display the data on the PED screen. In such a configuration, the combination of the camera/sensor, the PED and a suitable application running on the PED provide a personal thermal imaging system. Reasonable performance level, PED-compatible cameras available in the $500 or less cost range are becoming available and provide thermal imaging capability to a wide range of consumers in the past only available at much higher cost.

One aspect of some PED connectors such as lightning, micro-USB, and others is that the connector extension is limited in length for a variety of mechanical and electrical reasons not the topic of the current application. The result is that plug-in accessories must in some cases be mountable very close to and/or flush with the PED connector receptacle or the connection will not be made.

Another aspect of PED use is that many users wish to protect their PED from trauma and the environment, so the use of protective cases is prevalent. Some of these cases are designed for outdoor and/or severe environment use and are ruggedized, in some cases actually water proof and highly resistant to shock and moisture. Such cases currently include LifeProof and Otterbox, and these ruggedized cases are usually quite thick, so much so that many plug-in accessories cannot be used with ruggedized cases because the connector length is not enough to extend through the thick case structure and make connection with the PED. In fact even some charging cables cannot be used with these cases. For many plug-in devices, this is not an issue because they are intended to be used in environments where either no case or a thin less rugged case can be employed, and the accessory can make an adequate connection.

A thermal camera/sensor however would be desirable for use outdoors, in severe industrial environments and the like. However, current ruggedized cases are generally not compatible with plug-in thermal cameras, as well as with many other plug-in accessories. Moreover, unlike some plug-in accessories, such as battery extenders, it may not be desirable to leave a thermal camera plugged in when it is not in use, as it makes the PED less convenient to handle and may, for some camera designs, draw power. So described herein are embodiments that provide a ruggedized case for a PED and plug-in accessory, such as a thermal camera, that support configurations for operating with and without the accessory plugged in and for conveniently switching between the two operating configurations.

Figure 3:
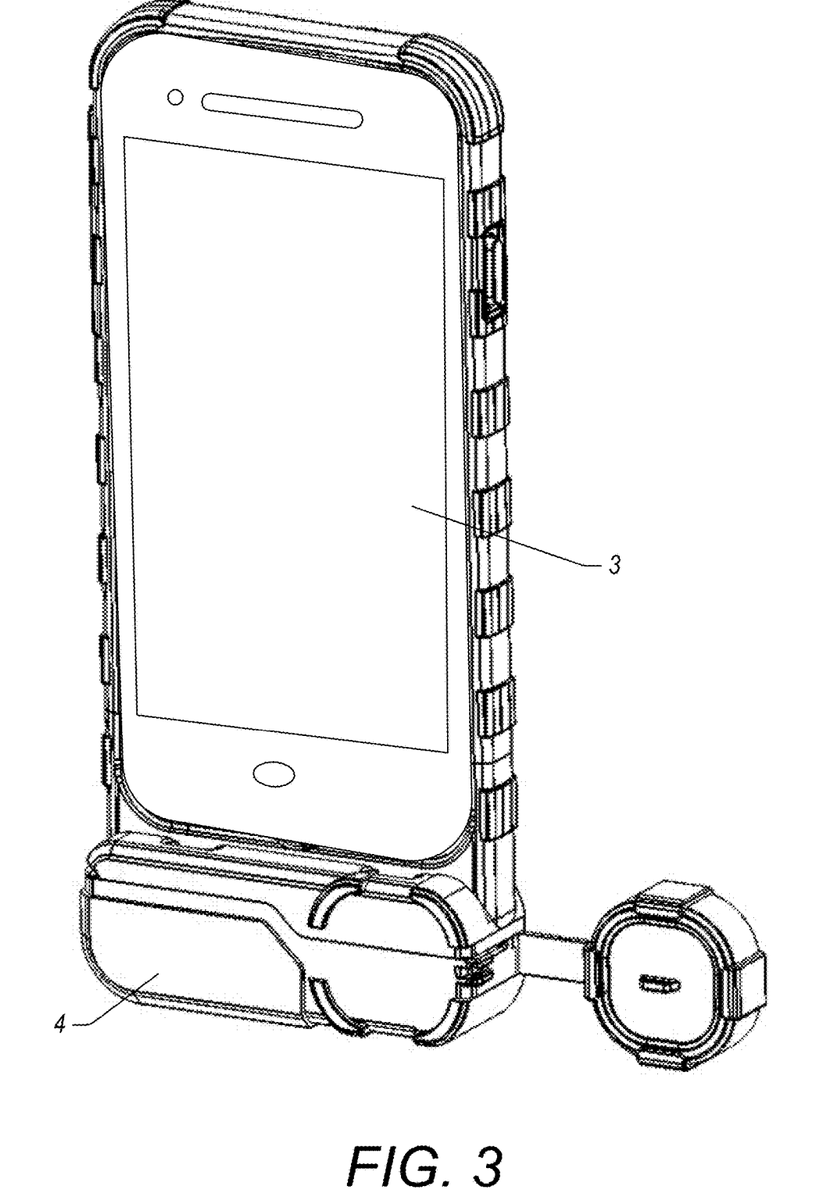
FIG. 3 illustrates a front view of a configuration for an example protective case for both a PED and a plug-in thermal imaging camera.
Figure 4:
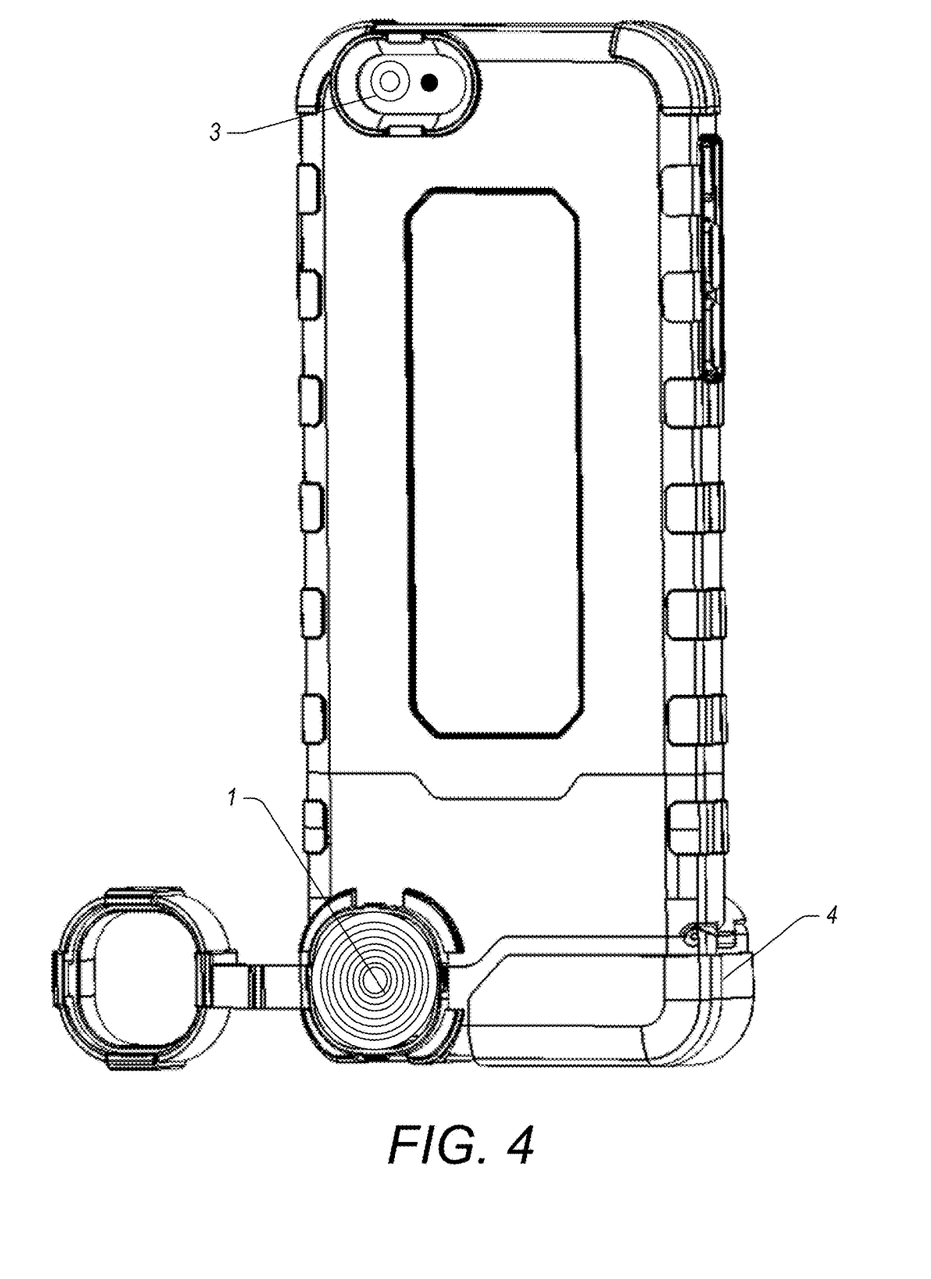
FIG. 4 illustrates a back view of a configuration for an example protective case for both a PED and a plug-in thermal imaging camera.

FIGS. 3 and 4 illustrate an example of a ruggedized protective case 4 for both PED 3 and camera 1. The construction of this case has a variety of features that allow it to function in a useful manner as a case for the camera and PED.

Figure 5:
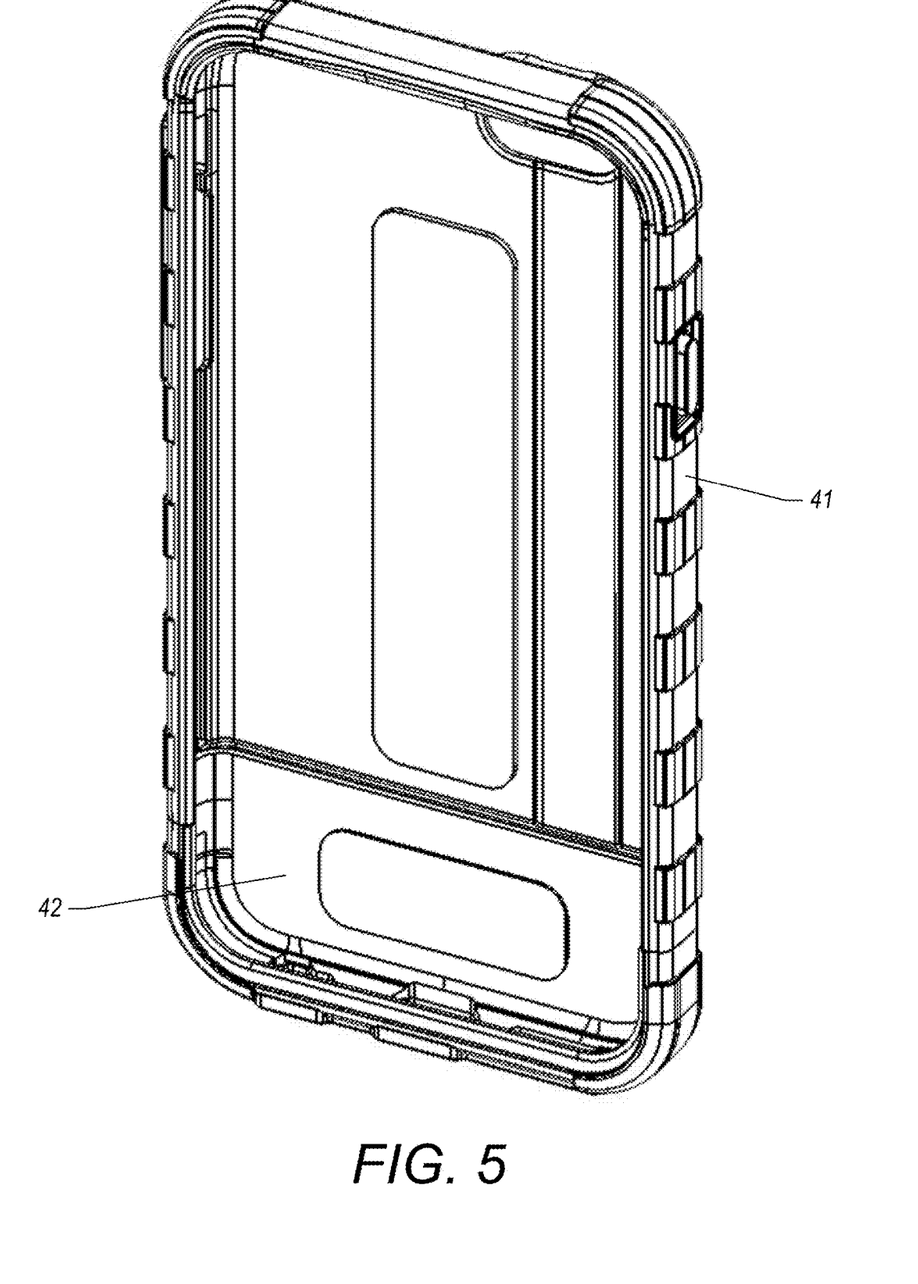
Figure 6:
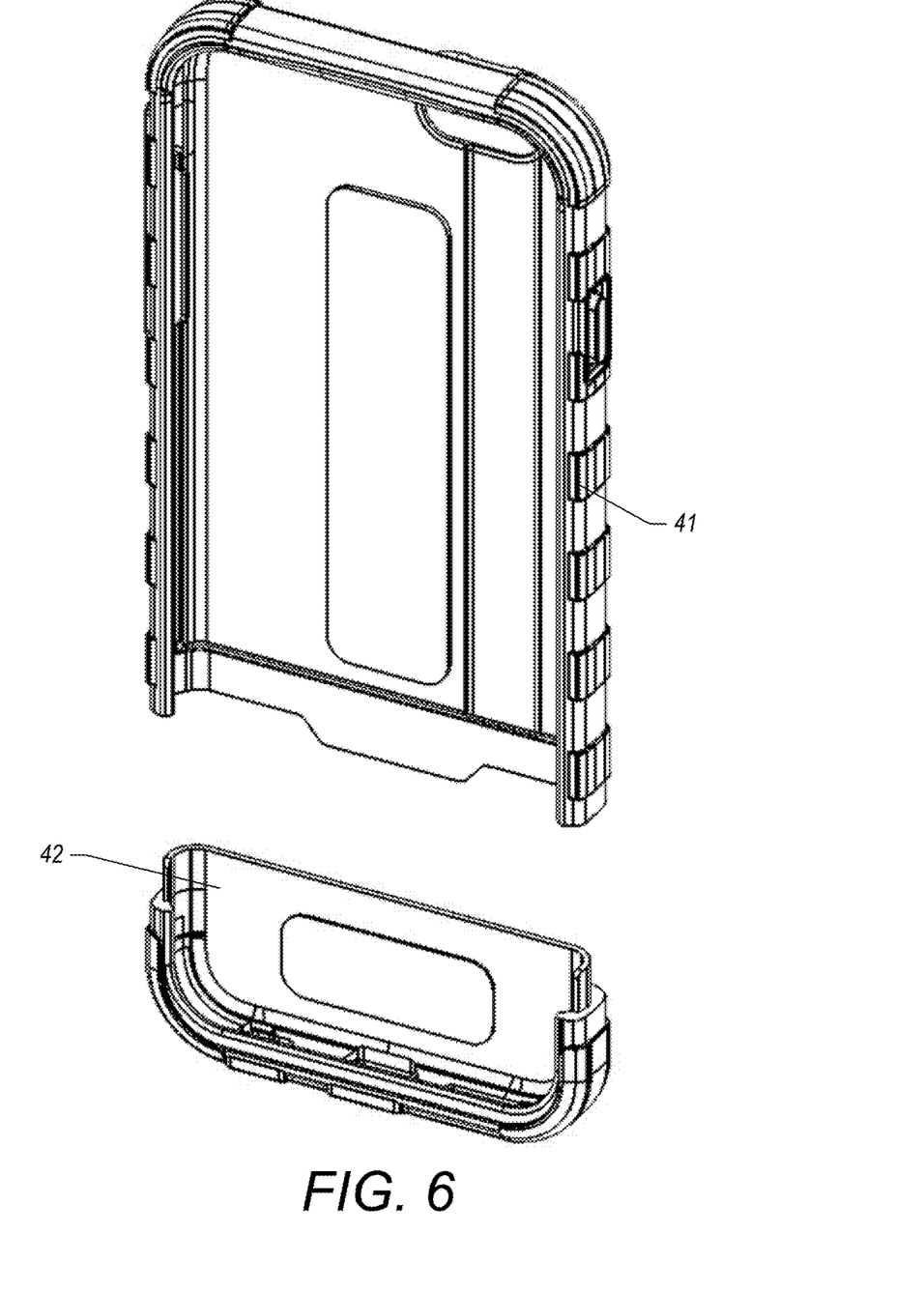

FIGS. 5 and 6 illustrate one aspect of the protective case. The case may include a first case section 41 that covers a portion of the PED that does not include the interface connector for the plug-in accessory. The first case section 41 may be configured to allow access to any PED controls and connection points as appropriate. The first case section 41 of the case may be used for operation with and without the plug-in accessory installed. FIGS. 5 and 6 also show a mating section 42, or non-camera case section 42, for protecting the portion of the PED with the interface connector. Non-camera case section 42 is used when the PED is operating without the plug-in accessory, and may be configured to both protect and allow access to the interface connector for normal use.

Figure 7:
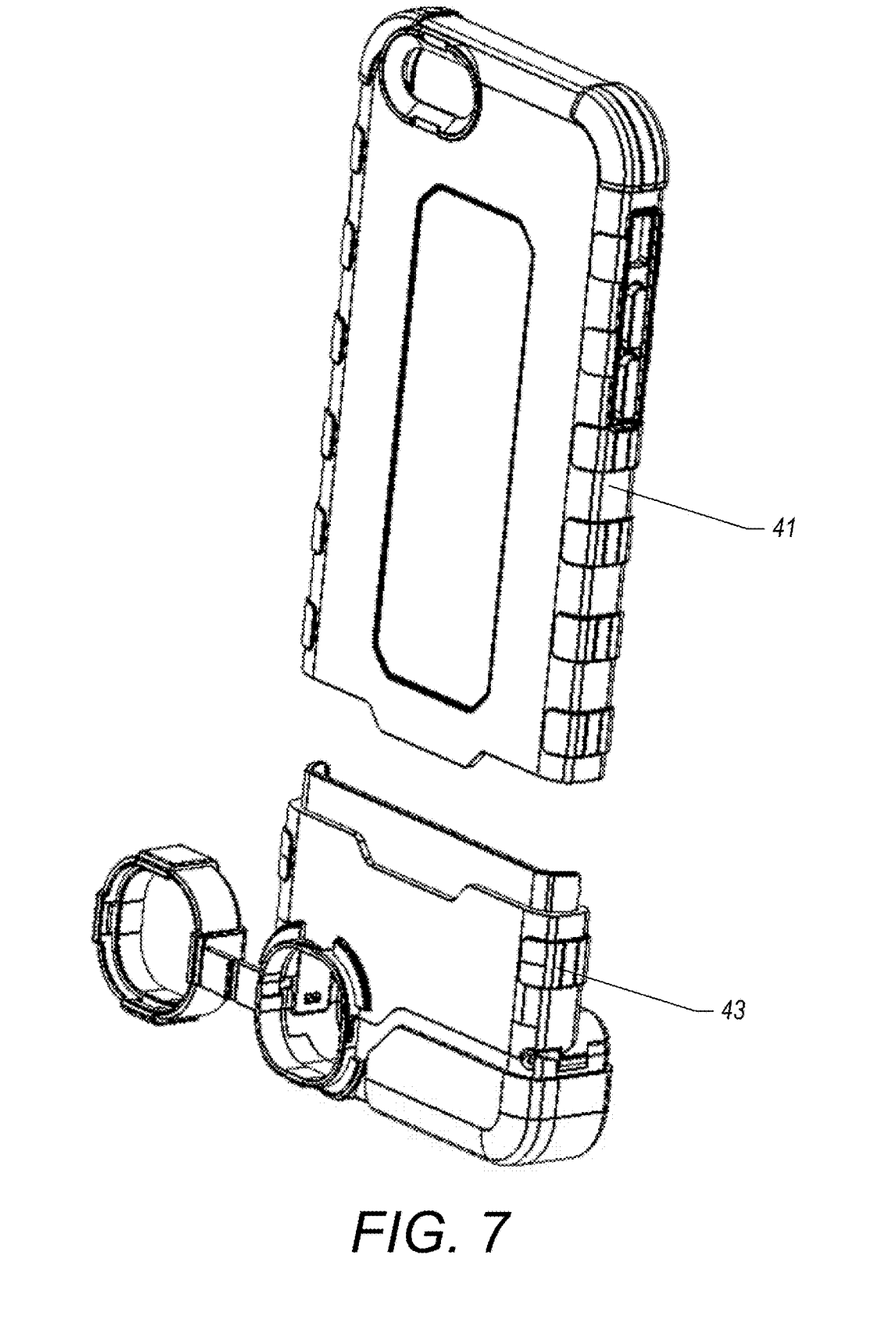
Figure 8:
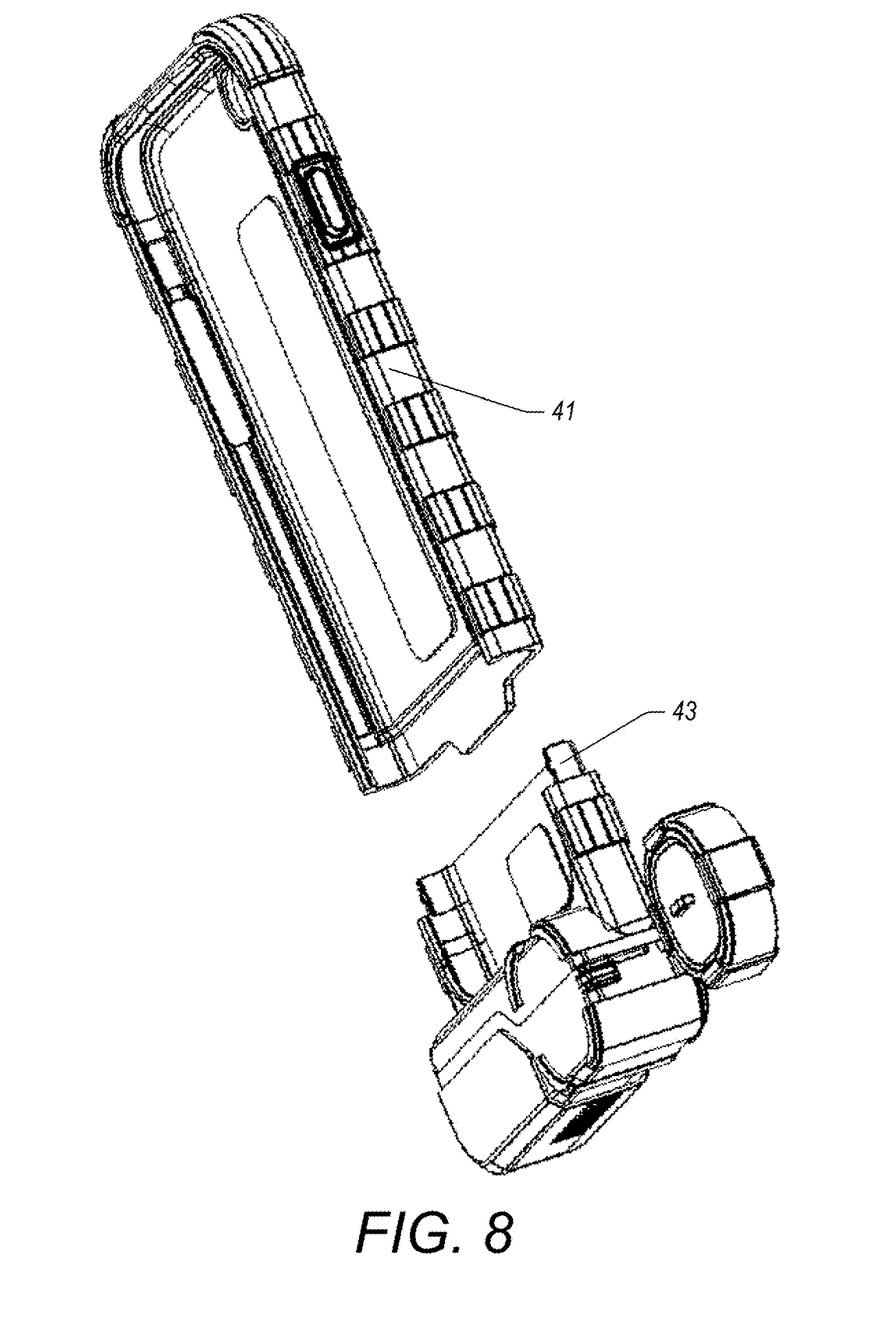
Figure 9:
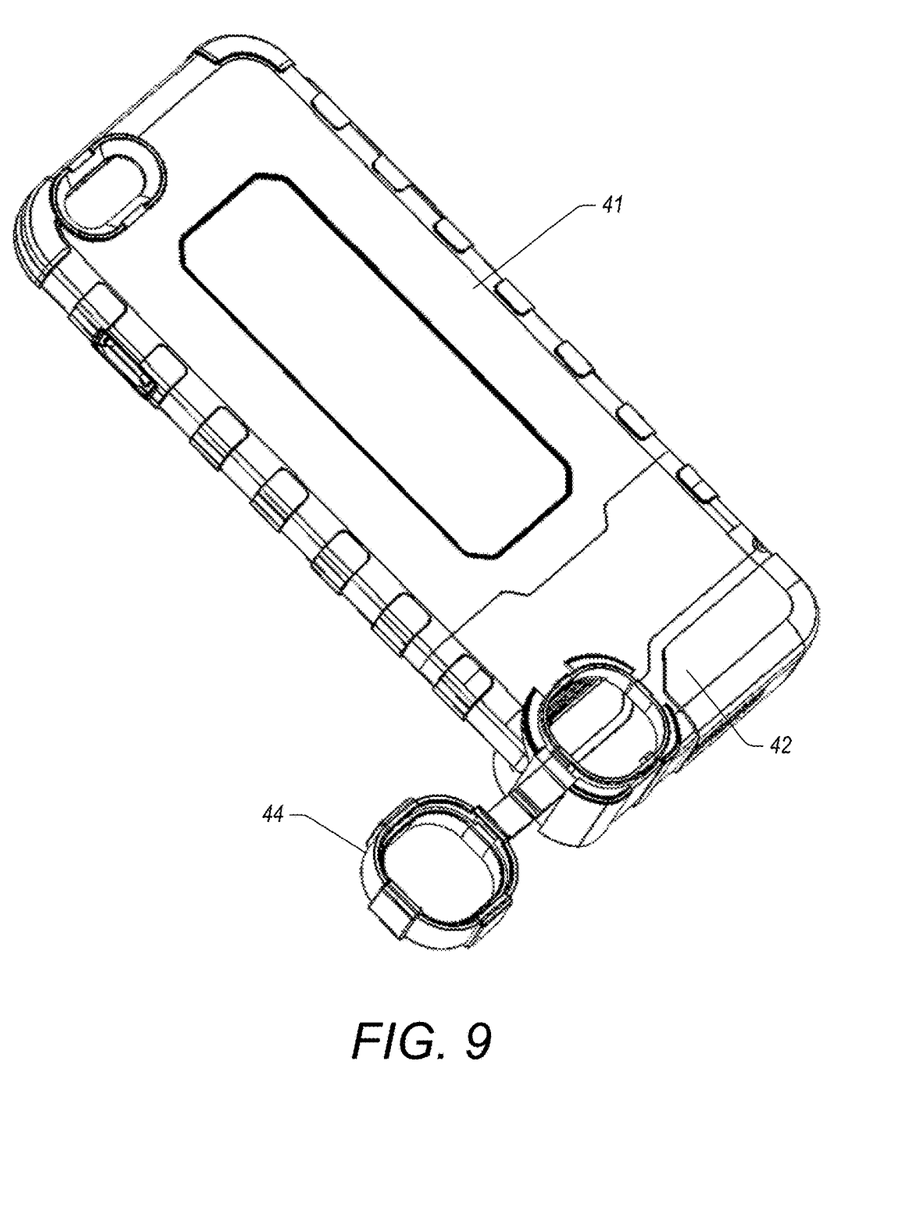

FIGS. 7-9 show an interchangeable case section 43, or camera case section 42, for the connector region of the PED, which can be used when the accessory is plugged in. For this scenario, non-camera case section 42 is removed and camera case section 43 is installed in its place. Both non-camera case section 42 and camera case section 43 are configured to mate with the first case section 41 when either is used. The combination of the first case section 41 and one of non-camera case section 42 or camera case section 43 provide protection for the PED. Camera case section 43 is further configured to protect the accessory, e.g., thermal imaging camera, and is also configured to position the connector of the plug-in accessory relative to the PED connector so that it accomplishes an electrically and mechanically correct and operable attachment, providing structural and electrical connectivity. Thus with interchangeable case sections 42, 43 configured as described herein, it is easy and convenient to switch from accessory operation to non-accessory operation while maintaining electrical and mechanical connectivity while using a protective case, including a protective case that has rugged, thick walls, protecting the PED and/or the PED/camera combination.

The embodiments shown illustrate one approach to achieving these goals. In the non-accessory operation, case sections 41 and 42 may be slide-on sleeves that friction fit with the PED and mate securely to each other, possibly sealing with a screen cover, and providing access to PED controls and connection points as needed. In the non-operating mode, case sections 41 and 42 act as a normal protective, possibly ruggedized, protective case. Other PED case designs, such as snap-together, magnetic retention and others may be employed in a like manner.

The accessory, such as a thermal camera, may be installed in camera case section 43. Non-camera case section 42 is removed from the PED and camera case section 43 may have a mating slide-on sleeve that mates with and seals with the PED and the first case section 41 in place of non-camera case section 42, or another mating method (snap-together, magnetic, etc.). In the embodiment shown, the camera case section 43 is a snap-together enclosure for a camera, such as a thermal camera or other plug-in accessory, and the camera case section 43 transitions into a slide-on sleeve element analogous to the first case section 41. Again other retention mechanisms, such as magnetic or friction fit may be employed. In this illustrative embodiment, the top of the camera case section 43 is open to the sleeve, such that the connector of the plug-in accessory is presented to the PED connector as it would be if neither PED nor camera was encased. The dimensions of the case sections are chosen such that when the camera case section 43 and the first case section 41 are mated together on the PED, the connectors are firmly seated together. The case sections 41, 43 friction fit with optional retaining tabs serve to further increase the structural integrity of the PED/camera combination. The camera case section 43 may also serve as a convenient storage enclosure for the camera when the camera is not mated to the PED.

The illustrative embodiments shown provide features of protected operation for both accessory- and non-accessory modes, easy change between the two modes, protection for the accessory, and compatibility with ruggedized case designs. The snap-together enclosure, slide on sleeve approach provides an illustrative example of how to achieve these or similar goals but other enclosure/case approaches compatible with interchangeable sections may be contemplated. Latched enclosures that compress o-rings are often used in severe environment cases, and versions of these such as some LifeProof designs are used in the PED product space. Magnetic retention and other designs are compatible with the basic concepts disclosed in this application. Those concepts are also applicable for accessories other than thermal cameras as well.

For the case where the accessory is a thermal camera or sensor, a removable lens cap 44 may be desirable. The lens cap 44 may be tether-able and stow-able at a stowing point as well. Also it may be advantageous for a thermal camera in an enclosure to provide the possibility of cooling vents to minimize temperature rise and/or variations within the camera enclosure, since rapid temperature variations affects thermal sensor performance. Such vents may in some embodiments provide torturous air pathways to minimize moisture incursion.

Camera case section 43 for PEDs with speakers adjacent the interface connector may enclose the speakers as well as the camera. To reduce or eliminate adverse effects on sound from the speakers, the protective cases described herein can be configured to include an air pathway and/or a resonator to provide a sound path from the speakers to the exterior of the case sections.

The embodiments described herein are exemplary. Modifications, rearrangements, substitutions, etc. may be made to these embodiments and still be encompassed within the teachings set forth herein. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or components. Thus, such conditional language is not generally intended to imply that features, elements and/or components are in any way required for one or more embodiments. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A protective case for a personal electronics device (PED) and an optional plug-in accessory interface to the PED, wherein the accessory mounts to the PED by plugging in to a PED interface connector, the case comprising:
   at least one first case section comprising a sleeve covering a portion of the PED not holding the connector;
   a first interchangeable case section comprising a slide-on sleeve that mates with the first case section in operation without the accessory installed such that the protective case covers substantially the entire PED and provides access to at least one control or connection point; and
   a second interchangeable case section comprising:
      a slide-on sleeve that mates with the first case section such that the protective case covers substantially the entire PED during operation of the accessory and provides access to at least one control or connection point; and
      an accessory protective portion configured to protect the accessory and complete the case protection while maintaining operable accessory-to-PED-connector electrical and mechanical connection when the case sections including the accessory are mated together;
   wherein the accessory is different from and detachable from the second interchangeable case section; and
   wherein the second interchangeable case section is not configured to send signals to the PED.

2. The case of claim 1 wherein the accessory is one of a thermal imaging camera or thermal imaging sensor.

3. The case of claim 2, wherein the accessory mating section includes a removable lens cap for the camera.

4. The case of claim 3, including a tether for the lens cap.

5. The case of claim 3, including a stowing point for the lens cap when the lens cap is removed.

6. The case of claim 2, wherein:
   the first case section is a slide-on sleeve covering a part of the non-connector portion of the PED, with suitable access to controls and connection points,
   the interchangeable section for non-thermal camera operation is a slide-on sleeve that mates with the first case section, and covers the remainder of the PED with suitable access to controls and connection points; and
   the interchangeable camera case section for thermal camera operation includes a protective camera portion and a slide-on sleeve that mates with the first case section, configured to mate the camera connector to the PED connector when the camera case section is slid on to the PED.

7. The case of claim 6, wherein the thermal camera protective portion is a snap-together enclosure.

8. The case of claim 6, wherein the interchangeable thermal camera section includes thermal venting.

9. The case of claim 6, wherein the interchangeable thermal camera section an air pathway to a sound resonator for compatibility with PED speakers located within the protective area of the section.

10. The case of claim 1, wherein the case is a ruggedized design.

11. The case of claim 1, wherein the PED interface may be at one of a PED interface connector, including lightning connectors, a micro USB connectors, and 35 mm ports.

12. The case of claim 1, wherein the PED interface may include network interfaces including Wi-Fi and Bluetooth.

13. A protective case for a personal electronics device (PED) configured for use with or without an accessory, wherein the accessory mounts to the PED by plugging in to a PED interface connector, the case comprising:
- a first case section comprising a mechanical case coupling and a unitary body configured to substantially cover a periphery of a PED to provide protection to the PED;
- a PED case section comprising a slide-on sleeve configured to mate to the mechanical case coupling feature of the first case section such that the protective case covers substantially the entire PED and provides access to at least one control or connection point; and
- an accessory case section comprising an accessory enclosure configured to receive an accessory and a slide-on sleeve configured to mate to the mechanical case coupling feature of the first case section such that the protective case covers substantially the entire PED during operation of the accessory and provides access to at least one control or connection point,
- wherein the PED case section and the accessory case section are configured to be interchangeably coupled to the first case section to form a protective enclosure,
- wherein, in a first configuration, the PED case section is mechanically coupled to the first case section to form a protective enclosure for a PED,
- wherein, in a second configuration, the accessory case section is mechanically coupled to the first case section to form a protective enclosure for a PED and an accessory coupled to the PED,
- wherein the accessory is different from and detachable from the accessory case section, and
- wherein the accessory case section is not configured to send signals to the PED.

14. The case of claim 13, wherein the first case section is configured to cover corners of a PED.

15. The case of claim 13, wherein the first case section is configured to cover all four corners of a PED and to provide access to the PED interface connector.

16. A protective case for a personal electronics device (PED) configured for use with or without an accessory, wherein the accessory mounts to the PED by plugging in to a PED interface connector, the case comprising:
- a first case section comprising a mechanical case coupling and a unitary body configured to substantially cover a periphery of a PED to provide protection to the PED;
- a removable case section comprising a slide-on sleeve configured to be seated in the mechanical case coupling to provide a smooth exterior surface of the protective case covering substantially the entire PED and providing access to at least one control or connection point; and
- an accessory case section comprising an accessory enclosure and a slide-on sleeve configured to mate to the mechanical case coupling feature of the first case section when the removable case section is removed to expose the mechanical case coupling feature, the accessory enclosure configured to receive an accessory, wherein the accessory case section and the first case section combine to cover substantially the entire PED during operation of the accessory and provide access to at least one control or connection point,
- wherein, in a PED configuration, the removable case section is mechanically coupled to the first case section,
- wherein, in an accessory configuration, the removable case section is removed from the first case section and the accessory case section is mechanically coupled to the first case section to form a protective enclosure for a PED and an accessory coupled to the PED,
- wherein the accessory is different from and detachable from the accessory case section, and
- wherein the accessory case section is not configured to send signals to the PED.

17. The case of claim 16, wherein the accessory case section forms an opening for a lens of an imaging system positioned in the accessory enclosure.

18. The case of claim 17, wherein the accessory case section includes a removable lens cap to selectively cover the opening.

19. A kit configured to provide protective case for a personal electronics device (PED) configured for use with or without an accessory, wherein the accessory mounts to the PED by plugging in to a PED interface connector, the kit comprising:
- a first case section comprising a mechanical case coupling and a unitary body configured to substantially cover a periphery of a PED to provide protection to the PED;
- a PED case section comprising a slide-on sleeve configured to mate to the mechanical case coupling feature of the first case section such that the protective case covers substantially the entire PED and provides access to at least one control or connection point; and
- an accessory case section comprising an accessory enclosure and a slide-on sleeve configured to mate to the mechanical case coupling feature of the first case section such that the protective case covers substantially the entire PED during operation of the accessory and provides access to at least one control or connection point,
- wherein the PED case section and the accessory case section are configured to be interchangeably coupled to the first case section to form a protective enclosure,
- wherein, in a first configuration, the PED case section is mechanically coupled to the first case section to form a protective enclosure for a PED,
- wherein, in a second configuration, the accessory case section is mechanically coupled to the first case section to form a protective enclosure for a PED and an accessory coupled to the PED,
- wherein the accessory is different from and detachable from the accessory case section, and
- wherein the accessory case section is not configured to send signals to the PED.

20. The kit of claim 19, wherein the accessory case section forms an opening for a lens of an imaging system positioned in the accessory enclosure.

* * * * *